United States Patent
Yoon et al.

(10) Patent No.: US 10,437,112 B2
(45) Date of Patent: Oct. 8, 2019

(54) TRANSPARENT ELECTRODE, TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Euk Kun Yoon, Gyeonggi-do (KR); Sung Jin Noh, Gyeonggi-do (KR); Han Tae Ryu, Chungcheongbuk-do (KR); Dong Ki Keum, Daejeon (KR); Min Soo Seo, Gyeonggi-do (KR); Eung Goo Cho, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 15/661,413

(22) Filed: Jul. 27, 2017

(65) Prior Publication Data

US 2018/0046005 A1    Feb. 15, 2018

(30) Foreign Application Priority Data

Aug. 9, 2016   (KR) .................. 10-2016-0101157
Dec. 23, 2016  (KR) .................. 10-2016-0178001

(51) Int. Cl.
*G06F 1/16*     (2006.01)
*G06F 3/041*    (2006.01)
(Continued)

(52) U.S. Cl.
CPC ........ *G02F 1/1343* (2013.01); *G02F 1/13338* (2013.01); *G06F 1/16* (2013.01);
(Continued)

(58) Field of Classification Search
CPC ...... G02F 1/1343; G02F 1/13338; G06F 1/16; G06F 3/041; G06F 2203/04103
(Continued)

(56) References Cited

U.S. PATENT DOCUMENTS 5,362,552 A * 11/1994 Austin .................. B32B 17/06
                                                    428/216
5,556,694 A *  9/1996 Austin .................. G06F 3/044
                                                    359/582

(Continued)

FOREIGN PATENT DOCUMENTS

CN    203894725 U    10/2014
CN    105164620 A    12/2015
(Continued)

OTHER PUBLICATIONS

Rensselaer Polytechnic Institute Refractive index and extinction coefficient of materials (Year: 2004).*
(Continued)

*Primary Examiner* — Andargie M Aychillhum
*Assistant Examiner* — Michael F McAllister
(74) *Attorney, Agent, or Firm* — The PL Law Group, PLLC

(57) ABSTRACT

A transparent electrode includes a first metal oxide layer, a metal layer and a second metal oxide layer. The first metal oxide layer, the metal layer and the second metal oxide layer are sequentially stacked to form a mesh pattern. A reflectivity at a wavelength of 550 nm of the mesh pattern is in a range from 5% to 20%.

15 Claims, 2 Drawing Sheets

(51) Int. Cl.
*G06F 3/044* (2006.01)
*G02F 1/1343* (2006.01)
*G02F 1/1333* (2006.01)

(52) U.S. Cl.
CPC ............ *G06F 1/1652* (2013.01); *G06F 3/041* (2013.01); *G06F 3/044* (2013.01); *G06F 2203/04102* (2013.01); *G06F 2203/04103* (2013.01); *G06F 2203/04112* (2013.01)

(58) Field of Classification Search
USPC ........................................................ 174/250
See application file for complete search history.

(56) References Cited

U.S. PATENT DOCUMENTS

| | | | | |
|---|---|---|---|---|
| 6,104,534 A * | 8/2000 | Ohta | ...................... | G02B 1/116 359/588 |
| 6,583,935 B1 * | 6/2003 | Wrzesinski | ............. | B32B 15/08 359/582 |
| 7,303,809 B2 * | 12/2007 | Choi | ................... | G02F 1/13439 349/147 |
| 7,934,966 B2 * | 5/2011 | Sasaki | .................... | H05K 3/106 313/112 |
| 8,264,466 B2 * | 9/2012 | Maag | ....................... | G06F 3/044 345/173 |
| 8,264,494 B2 * | 9/2012 | Kilani | ................... | G06T 15/005 345/501 |
| 8,274,494 B2 * | 9/2012 | Frey | ........................ | G06F 3/044 345/174 |
| 8,586,874 B2 * | 11/2013 | Kuriki | ..................... | G06F 3/044 174/261 |
| 8,766,105 B2 * | 7/2014 | Kuriki | ..................... | G06F 3/044 174/250 |
| 9,204,535 B2 * | 12/2015 | Lim | .................. | H01L 31/02246 |
| 9,489,914 B2 * | 11/2016 | Ha | ....................... | H05K 1/0274 |
| 2002/0182393 A1 * | 12/2002 | Chu | ....................... | G02B 1/116 428/216 |
| 2008/0308151 A1 * | 12/2008 | Den Boer | ......... | H01L 31/02168 136/256 |
| 2009/0160783 A1 * | 6/2009 | Yang | ....................... | G06F 3/044 345/173 |
| 2009/0219257 A1 * | 9/2009 | Frey | ........................ | G06F 3/044 345/173 |
| 2009/0219258 A1 * | 9/2009 | Geaghan | ................ | G06F 3/045 345/173 |
| 2010/0326722 A1 * | 12/2010 | Watazu | | |
| 2011/0057900 A1 * | 3/2011 | Huang | .................... | G06F 3/044 345/174 |
| 2011/0099805 A1 * | 5/2011 | Lee | ........................ | G06F 3/044 29/846 |
| 2011/0102370 A1 * | 5/2011 | Kono | ..................... | G06F 3/044 345/174 |
| 2011/0120554 A1 * | 5/2011 | Chhajed | .................. | C09D 1/00 136/259 |
| 2011/0210656 A1 * | 9/2011 | Lemmer | ............... | E06B 3/6715 312/405 |
| 2011/0290631 A1 * | 12/2011 | Ku Riki; Tadashi | ... | G06F 3/044 200/600 |
| 2012/0127578 A1 * | 5/2012 | Bright | .................... | G02B 5/207 359/585 |
| 2012/0146942 A1 * | 6/2012 | Kamoshida | ............. | G06F 3/044 345/174 |
| 2015/0188078 A1 * | 7/2015 | Osawa | ................ | H01L 51/5234 257/40 |
| 2015/0261259 A1 * | 9/2015 | Endo | ..................... | G06F 1/1652 361/679.06 |
| 2017/0177148 A1 * | 6/2017 | Lee | ........................ | G06F 3/044 |
| 2017/0278900 A1 * | 9/2017 | Yang | ..................... | H01L 27/3272 |
| 2017/0353181 A1 * | 12/2017 | Kim | ....................... | H03K 17/962 |
| 2018/0024388 A1 * | 1/2018 | Shingai | ..................... | B32B 7/02 345/173 |
| 2018/0033833 A1 * | 2/2018 | An | ........................ | G06F 3/0412 |
| 2018/0033834 A1 * | 2/2018 | Jun | ....................... | G06F 3/0412 |

FOREIGN PATENT DOCUMENTS

| | | |
|---|---|---|
| CN | 105590662 A | 5/2016 |
| JP | 2008-098169 | * 10/2007 |
| JP | 2008-098169 | * 4/2008 |
| KR | 10-2013-0116597 A | 10/2013 |

OTHER PUBLICATIONS

Rensselaer Polytechnic Institute Refractive index and extinction coefficient of materials u https ://www. ecse. rp i. edu/-sch u bert/ Educational-resources/ Educational-resources. htm https ://www. ecse. rp i. edu/ . . . /Mate ri als-R efractive-i ndex-and-exti nctio n-coefficie nt. pdf (Year: 2004).*

Rensselaer Polytechnic Institute Refractive index and extinction coefficient of materials https ://www. ecse. rp i. edu/-sch u berU Educational-resources/ Educational-resources. htm https ://www. ecse. rp i. edu/ . . . /Mate ri als-R efractive-i ndex-and-exti nctio n-coefficie nt. pdf (Year: 2004).*

Office action dated Oct. 31, 2018 from China Patent Office in a counterpart China Patent Application No. 201710662030.2 (all the cited references are listed in this IDS.) (English translation is also submitted herewith.).

* cited by examiner

TRANSPARENT ELECTRODE, TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Applications No. 10-2016-0101157 filed on Aug. 9, 2016 and No. 10-2016-0178001 filed on Dec. 23, 2016 in the Korean Intellectual Property Office (KIPO), the entire disclosure of which is incorporated by reference herein.

BACKGROUND

1. Field

The present invention relates to a transparent electrode, a touch sensor and an image display device including the same.

2. Description of the Related Art

As information technologies have been rapidly developed, various demands for slim, light-weighted and eco-friendly display devices are increasing. For example, a flat panel display device such as a liquid crystal display device, a plasma display panel device, an electro luminescent display device, etc., has been developed to meet the demands.

Further, a touch screen panel which is an input device configured to transfer a user's instruction by selecting an object demonstrated on a display plane of the display device with a human hand or an additional input tool has been also highlighted. The touch screen panel may be disposed at a front face of the display device, and may convert a touched area being in contact with the human hand or the input tool into an electrical signal.

Accordingly, an instruction selected at the touched area may be received as an input signal. An individual input device such as a keyboard or a mouse which may be connected to the image display device may be replaced with the touch screen panel, and thus the touch screen panel has been widely used in various devices.

An electrode of the touch screen panel may be formed on an entire front surface of a display panel, and a transparent electrode including, e.g., an indium tin oxide (ITO) is commonly used. However, an ITO electrode has a high brittleness, and thus is not easily and widely applied to a flexible touch sensor. Additionally, the ITO electrode may have a relatively high resistance, and thus may not be applicable to a large-scaled display device.

A metal mesh structure may be employed as the transparent electrode due to ductility and low-resistance thereof. Thus, the metal mesh structure may be easily employed to a flexible and large-scaled touch sensor. However, the metal mesh structure may be disadvantageous in optical and visible properties.

For example, Korean Patent Laid-Open Publication No 2013-0116597 discloses a touch screen panel.

SUMMARY

According to an aspect of the present invention, there is provided a transparent electrode that may have a high transparency and a low reflectivity, and may not be visually observed.

According to an aspect of the present invention, there is provided a transparent electrode that may have an improved bending property to be efficiently applied to a flexible display device.

According to an aspect of the present invention, there is provided a transparent electrode that may have a low sheet resistance to be efficiently applied to a large-scaled display device.

According to an aspect of the present invention, there is provided a transparent electrode that may have a high adhesion to a substrate.

According to an aspect of the present invention, there is provided a touch sensor including the transparent electrode, and an image display device including the touch sensor.

The above aspects of the present inventive concepts will be achieved by one or more of the following characteristics:

(1) A transparent electrode including a first metal oxide layer, a metal layer and a second metal oxide layer, wherein the first metal oxide layer, the metal layer and the second metal oxide layer are sequentially stacked to form a mesh pattern, wherein a reflectivity at a wavelength of 550 nm of the mesh pattern is in a range from 5% to 20%.

(2) The transparent electrode according to the above (1), wherein the reflectivity at a wavelength of 550 nm is in a range from about 5% to 13%.

(3) The transparent electrode according to the above (1), wherein a refractive index of each the first metal oxide layer and the second metal oxide layer at a wavelength of 550 nm is in a range from 1.7 to 2.2, wherein a refractive index of the metal layer at a wavelength of 550 nm is in a range from 0.1 to 1.0, and an extinction coefficient of the metal layer is in a range from 2.0 to 7.0.

(4) The transparent electrode according to the above (1), wherein a thickness of each the first metal oxide layer and the second metal oxide layer is in a range from 5 nm to 140 nm, and a thickness of the metal layer is in a range from 5 nm to 30 nm.

(5) The transparent electrode according to the above (1), wherein a thickness of each the first metal oxide layer and the second metal oxide layer is in a range from 30 nm to 50 nm, and a thickness of the metal layer is in a range from 8 nm to 15 nm.

(6) The transparent electrode according to the above (1), wherein a line-width of the mesh pattern is in a range from 1 μm to 7 μm.

(7) The transparent electrode according to the above (1), wherein each the first metal oxide layer and the second metal oxide layer includes at least one selected from the group consisting of indium tin oxide (ITO), indium zinc oxide (IZO), aluminum zinc oxide (AZO), gallium zinc oxide (GZO), indium tin zinc oxide (ITZO), zinc tin oxide (ZTO), indium gallium oxide (IGO), tin oxide ($SnO_2$) and zinc oxide (ZnO).

(8) The transparent electrode according to the above (1), wherein the metal layer includes at least one selected from the group consisting of silver, gold, copper, aluminum, platinum, palladium, chromium, titanium, tungsten, niobium, tantalum, vanadium, calcium, iron, manganese, cobalt, nickel, zinc and an alloy thereof.

(9) The transparent electrode according to the above (1), wherein a haze of the transparent electrode is in a range from −1% to +1%

(10) The transparent electrode according to the above (1), wherein a color difference (b*) of the transparent electrode is in a range from −4 to +4.

(11) The transparent electrode according to the above (1), wherein a linear resistance is not changed when the transparent electrode is folded with a radius curvature of 1 mm or more along an 180° direction.

(12) A touch sensor including the transparent electrode of the above (1).

(13) The touch sensor according to the above (12), further including a substrate on which the transparent electrode is disposed, the substrate including at least one selected from the group consisting of cyclo olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclo olefin copolymer (COC) and polymethylmethacrylate (PMMA).

(14) The touch sensor according to the above (12), wherein the transparent electrode includes a plurality of isolated sensing patterns which are disposed on the same layer.

(15) The touch sensor according to the above (14), wherein the sensing patterns includes a first sensing pattern formed along a first direction, a second sensing pattern formed along a second direction, and a bridge electrode connecting isolated unit patterns of the second sensing pattern.

(16) The touch sensor according to the above (14), wherein the touch sensor is a self-capacitance type

(17) A film touch sensor including a separation layer and the touch sensor formed on the separation layer.

(18) The film touch sensor according to the above (17), further including a protective layer between the touch sensor and the separation layer.

(19) An image display device including the touch sensor according to the above (12).

(20) An image display device including the film touch sensor according to the above (17).

The transparent electrode according to example embodiments as described above may have a high transparency and a low reflectivity, and may not be visually observed. The transparent electrode may also have improved bending property to be efficiently applied to a flexible display device. The transparent electrode may also have a low sheet resistance to be efficiently applied to a large-scaled display device. The transparent electrode may also have a high adhesion to a substrate. Thus, the transparent electrode may be effectively applied to a touch sensor and an image display device.

DETAILED DESCRIPTION

According to example embodiments of the present inventive concepts, a transparent electrode including a mesh pattern structure is provided. The mesh pattern may include a first metal oxide layer, a metal layer and a second metal oxide layer. A reflectivity of the mesh pattern structure may be in a range from about 5% to about 20%. Therefore, the transparent electrode according to example embodiments may have a high transparency and a low reflectivity, and may not be visually observed. The transparent electrode may also have a low sheet resistance, an improved bending property and a high adhesion to a substrate to be efficiently applied to a flexible display device.

Figure 1:
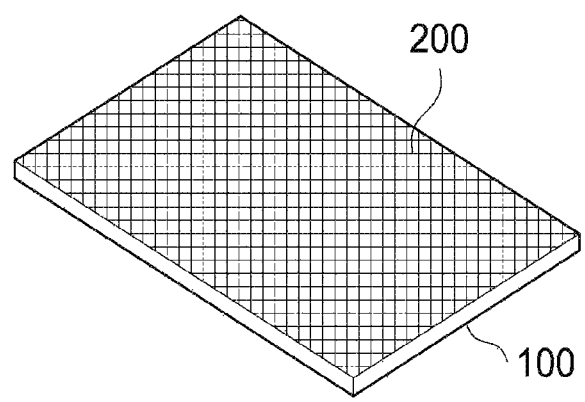
FIG. 1 illustrates a structure including a substrate and a transparent electrode formed thereon in accordance with example embodiments.
Figure 2:
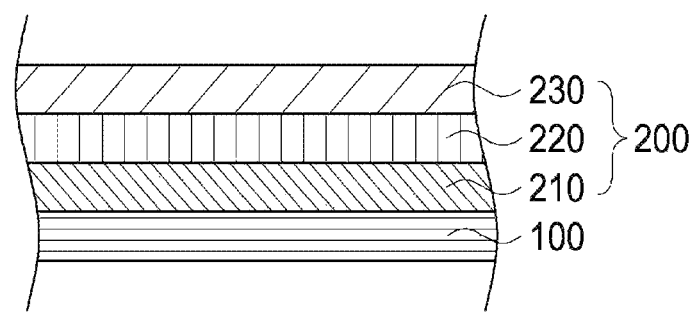
FIG. 2 is a cross-sectional view illustrating a mesh pattern in accordance with example embodiments.

FIG. 1 illustrates a structure including a substrate and a transparent electrode formed thereon in accordance with example embodiments. FIG. 2 is a cross-sectional view illustrating a mesh pattern in accordance with example embodiments Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

According to example embodiments, the transparent electrode may include a mesh pattern 200, and the mesh pattern 200 may include a first metal oxide layer 210, a metal layer 220 and a second metal oxide layer 230.

The term "transparent electrode" used herein may include an actual transparent electrode, and may also include an electrode including an opaque material which may become substantially transparent by, e.g., being patterned to have a non-visually narrow line-width.

The term "mesh pattern" or "mesh structure" used herein indicates a net-shaped pattern. In example embodiments, the mesh pattern or the mesh structure may serve as an electrode.

In example embodiments, the transparent electrode may have a structure of the mesh pattern 200 to have an improved bending property. Accordingly, a touch sensor including the transparent electrode may have enhanced folding, restoring and flexible properties. According to example embodiments, a linear resistance of the transparent electrode may be substantially not changed when the transparent electrode is folded along an 180° direction with a radius curvature being 1 mm or more, preferably 2 mm or more. The transparent electrode according to example embodiments may have a triple-layered structure in a structure of the mesh pattern 200 so that an excellent bending property may be obtained while maintaining an electrode property.

Non-limiting examples of a shape of the mesh structure may include a rectangular mesh structure, a diamond mesh structure, a hexagonal mesh structure, etc. In each structure, a length of a long side may be in a range from about 2 μm to about 500 μm, and may be properly adjusted depending on required conductivity, transparency, etc.

In example embodiments, a line-width of the mesh pattern 200 may be, e.g., in a range from about 1 μm to about 7 μm. A conventional mesh pattern electrode is visually observed even in a line-width of about 1 μm. However, the mesh pattern 200 according to example embodiments of the present inventive concepts may not be visible even in a line-width of about 1 μm to about 7 μm while maintaining a proper electrical conductivity.

According to example embodiments of the present inventive concepts, the mesh pattern 200 may include a first metal oxide layer 210, a metal layer 220 and a second metal oxide layer 230 which are sequentially stacked.

The mesh pattern 220 including the first metal oxide layer 210, the metal layer 220 and the second metal oxide layer 230 may be used as a transparent electrode instead of a conventional ITO electrode. Accordingly, the transparent electrode may have a high transparency and a low reflectivity, and may not be visually observed. The transparent electrode may also have a low sheet resistance, and enhanced folding, restoring and flexible properties to be efficiently applied to, e.g., a flexible touch sensor.

Thicknesses of the first metal oxide layer 210, the metal layer 220 and the second metal oxide layer 230 may be properly determined to achieve the high transparency, the low reflectivity and the improved flexible properties. For example, each thickness of the first metal oxide layer 210 and the second metal oxide layer 230 may be in a range from about 5 nm to about 140 nm, and a thickness of the metal layer 220 may be in a range from about 5 nm to about 30 nm. Preferably, each thickness of the first metal oxide layer 210 and the second metal oxide layer 230 may be in a range from about 30 nm to about 50 nm, and the thickness of the metal layer 220 may be in a range from about 8 nm to about 15 nm.

In some embodiments, the first and second metal oxide layers 210 and 230 may each include indium tin oxide (ITO), indium zinc oxide (IZO), aluminum zinc oxide (AZO), gallium zinc oxide (GZO), indium tin zinc oxide (ITZO), zinc tin oxide (ZTO), indium gallium oxide (IGO), tin oxide ($SnO_2$), zinc oxide (ZnO), or the like. These may be used alone or in a combination thereof. For example, the first and second metal oxide layers 210 and 230 may each include at least one of ITO or IZO in consideration of improving visual and bending properties. Particularly, the first and second metal oxide layers 210 and 230 each may include IZO.

The metal layer 220 may include a metal having improved electrical conductivity and reduced sheet resistance. For example, the metal layer 220 may include silver, gold, copper, aluminum, platinum, palladium, chromium, titanium, tungsten, niobium, tantalum, vanadium, calcium, iron, manganese, cobalt, nickel, zinc or an alloy from at least two thereof. Particularly, the metal layer 220 may include silver, gold, copper, aluminum, platinum or an alloy thereof. More particularly, the metal layer 220 may include an alloy of silver, copper and palladium (Ag—Pd—Cu: APC).

In example embodiments, the first metal oxide layer 210, the metal layer 220 or the second metal oxide layer 230 may be formed by a thin layer deposition process such as a physical vapor deposition (PVD) process, a chemical vapor deposition (CVD) process, etc. For example, the PVD process may include a reactive sputtering process.

In some embodiments, the mesh pattern 200 may be formed by, e.g., a photo-lithography process.

For example, the first metal oxide layer 210, the metal layer 220 or the second metal oxide layer 230 may be sequentially formed, and then the layers may be simultaneously or individually etched by the photo-lithography process to form the mesh pattern 200.

In example embodiments, the transparent electrode may have a low reflectivity in a range from about 5% to about 20% so that a user may not visually observe or recognize the transparent electrode.

In the transparent electrode according to example embodiments, the metal layer 200 may be employed to obtain a desired electrical conductivity. However, the reflectivity of the transparent electrode may be increased by the metal layer 220. Thus, according to the present inventive concepts, the transparent electrode may have a triple-layered structure formed as the mesh pattern 200 so that the reflectivity may be reduced. Further, a thickness and a refractive index of each layer may be controlled to achieve the reflectivity within the above-mentioned range.

If the reflectivity at a wavelength of 550 nm of the transparent electrode is less than about 5%, a thickness of the metal layer 220 may be excessively reduced to increase a resistance of the transparent electrode. If the reflectivity at a wavelength of 550 nm of the transparent electrode exceeds about 20%, the transparent electrode may be visually recognized. More preferably, the reflectivity at a wavelength of 550 nm of the transparent electrode may be in a range from about 5% to about 13% to prevent a visual recognition of the transparent electrode.

According the example embodiments, the transparent electrode may have the structure of the mesh pattern 200, and may include the first metal oxide layer 210, the metal layer 220 or the second metal oxide layer 230 which may be sequentially stacked. Thus, the transparent electrode may have a low reflectivity and a high transmittance to remarkably improve an optical property. Preferably, a transmittance at a wavelength of 550 nm of the transparent electrode may be in a range from about 60% to about 90%.

Additionally, the first and second metal oxide layers 210 and 230 may each have a relatively high refractive index, and the metal layer 220 may have a relatively low refractive index. Thus, the mesh pattern 200 may have a structure of high refractive index-low refractive index-high refractive index so that the transparent electrode may have both high transparency and low reflectivity to have the improved optical property. For example, the refractive index of the first metal oxide layer 210 and the second metal oxide layer 230 at a wavelength of 550 nm may each be in a range from about 1.7 to about 2.2. The refractive index of the metal layer 220 at a wavelength of 550 nm may be in a range from about 0.1 to about 1.0, and an extinction coefficient may be in a range from about 2.0 to about 7.0. The extinction coefficient may be measured by Equations 1 and 2.

$$I=I_0 e^{(-\alpha T)} \quad \text{[Equation 1]}$$

In the Equation 1, α represents an absorption coefficient, T represents a thickness, $I_0$ represents a light intensity before transmission, and I represents a light intensity after transmission.

$$\alpha = 4\pi k/\lambda_0 \quad \text{[Equation 2]}$$

In the Equation 2, α represents an absorption coefficient, k represents an extinction coefficient, and $\lambda_0$ represents a wavelength.

The transparent electrode may include the mesh pattern 200 which may have a stacked structure including the first metal oxide layer 210, the metal layer 220 and the second metal oxide layer 230 so that high transmittance and low reflectivity may be achieved and a transparent color difference value may be also achieved. In some embodiments, the color difference value of the transparent electrode (b*) may be in a range from −4 to +4 so that the transparent electrode may not be visually recognized and a color distortion may be prevented.

The transparent electrode may include the mesh pattern 200 which may have the stacked structure including the first metal oxide layer 210, the metal layer 220 and the second metal oxide layer 230 so that a haze may be reduced or prevented. In some embodiments, the transparent electrode may have a haze value in a range from about −1% to about +1%.

A touch sensor including the transparent electrode as described above may be also provided.

In the touch sensor, the transparent electrode having improved optical and bending properties, and low sheet resistance may be used as a touch sensing electrode. Thus, the touch sensor may be effectively implemented in a flexible display device.

The touch sensor may include a substrate 100 and the transparent electrode formed thereon. The substrate 100 may include a material widely known in the related art. For example, the substrate 100 may include cyclo olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclo olefin copolymer (COC), polymethylmethacrylate (PMMA), etc. Preferably, the transparent electrode may be formed on the substrate 100 including COP.

In an implementation, the touch sensor may include a plurality of isolated sensing patterns, and each sensing pattern may be configured to provide a coordinate information of a touched area. For example, when a human hand or an individual tool touches a cover window substrate, a change of capacitance according to the touched area may be transferred to a driving circuit via the sensing pattern and a position detecting line connected to the sensing pattern. The change of capacitance may be converted into an electrical signal to detect the touched area.

The plurality of the sensing patterns may be operated or formed in a self-capacitance (Self-Cap) type.

In an implementation, the touch sensor may include a first sensing pattern formed along a first direction, and a second sensing pattern formed along a second direction, and may further include a bridge electrode connecting isolated unit patterns of the second sensing pattern.

The first sensing pattern and the second sensing pattern may be formed along different directions. For example, the first direction may be an X-axis direction, and the second direction may be a Y-axis direction.

In this case, the first sensing pattern and the second sensing pattern may be configured to provide an X-axis coordinate information and a Y-axis coordinate information of the touched area, respectively. For example, when a human hand or an individual tool touches a cover window substrate, a change of capacitance according to the touched area may be transferred to the driving circuit via the first and second sensing patterns, and the position detecting line connected to the sensing patterns. The change of capacitance may be converted into an electrical signal by X and Y input processing circuits to detect the touched area.

The first sensing pattern and the second sensing pattern may include the transparent electrode including the mesh pattern 200. The first sensing pattern and the second sensing pattern may be disposed on substantially the same plane.

The isolated unit patterns of the second sensing pattern may be connected to each other by the bridge electrode. An insulation layer may be further formed such that the bridge electrode may be insulated from the first sensing pattern. The insulation layer may be interposed between the bridge electrode and the sensing pattern such that the first sensing pattern and the second sensing pattern may be insulated from each other.

According to example embodiments of the present inventive concepts, a film touch sensor including the touch sensor may be also provided.

The film touch sensor 300 may include a separation layer 310 and the touch sensor 320 formed thereon. The separation layer 310 may facilitate a detaching process from a carrier substrate during a fabrication of the film touch sensor 300.

The separation layer 310 may be formed of a polymer such as polyimide-based polymer, poly vinyl alcohol-based polymer, polyamic acid-based polymer, polyamide-based polymer, polyethylene-based polymer, polystyrene-based polymer, polynorbornene-based polymer, phenylmaleimide copolymer-based polymer, polyazobenzene-based polymer, polyphenylenephthalamide-based polymer, polyester-based polymer, polymethyl methacrylate-based polymer, polyarylate-based polymer, cinnamate-based polymer, coumarin-based polymer, phthalimidine-based polymer, chalcone-based polymer, and aromatic acetylene-based polymer, but it is not limited thereto. These may be used alone or in combination thereof.

In some embodiments, a peeling strength of the separation layer may be in arrange from about 0.01 N/25 mm to about 1 N/25 mm, preferably, from about 0.01 N/25 mm to about 0.2 N/25 mm. Within this range, the film touch sensor may be easily detached from the carrier substrate without generating a residue, and curl and crack due to a tension during the detaching process may be reduced or prevented.

For example, a thickness of the separation layer may be in a range from about 10 nm to about 1,000 nm, preferably, from about 50 nm to about 500 nm. Within this range, uniform peeling strength and pattern shape may be achieved.

In some embodiments, the film touch sensor 300 may further include a protective layer 330 interposed between the touch sensor 320 and the separation layer 310.

The transparent electrode may be coated and protected by the protective layer together with the separation layer. The separation layer may not be exposed to an etchant by the protective layer during the fabrication of the film touch sensor.

The protective layer may be formed of a polymer commonly known in the related art. For example, the protective may be an organic insulation layer that may be formed of a curable composition including polyol and a melamine curing agent.

The polyol may include, e.g., a polyether glycol derivative, a polyester glycol derivative, polycaprolactone glycol derivative, etc.

The melamine curing agent may include, e.g., a methoxy methyl melamine derivative, a methyl melamine derivative, a butyl melamine derivative, an isobutoxy melamine derivative, a butoxy melamine derivative, etc.

In some embodiments, the protective layer may be formed of an organic/inorganic hybrid curable composition which may include both organic and inorganic compounds so that cracks may be prevented during the detaching process.

For example, the organic compound may include the above-mentioned ingredients, and the inorganic compound may include a silica-based nanoparticle, a silicon-based nanoparticle, a glass nanofiber, etc.

According to example embodiments, a composition for forming the separation layer may be coated on the carrier substrate to form the separation layer, the touch sensor including the transparent electrode may be formed on the separation layer, and then the carrier substrate may be removed to obtain the film touch sensor having improved flexibility. Detailed processes or steps are described below.

The composition for forming the separation layer having ingredients and properties as described above may be coated on the carrier substrate to form the separation layer.

The composition for forming the separation layer may be coated by a process commonly known in the related art, e.g., a spray coating, a roll coating, a slit nozzle coating such as a discharge nozzle coating, a spin coating such as a center dispense spin coating, an extrusion coating, a bar coating, or a combination thereof. The composition may be dried after the coating process. For example, a heat drying (pre-baking) and a vacuum drying may be performed, and then a solvent may be evaporated by a heating process. A heating temperature may be in a range from about 80° C. to about 250° C.

The carrier substrate may serve as a base for forming the separation layer, and may have a planar top surface and a proper strength for uniformly forming the separation layer and other layers subsequently formed thereon. For example, a glass substrate or a plastic substrate may be used as the carrier substrate.

The above-described layers for forming the transparent electrode or the touch sensor may be formed on the separation layer. The first metal oxide layer, the metal layer and the second metal oxide layer may be formed by a thin layer deposition process including a physical vapor deposition (PVD) process such as a reactive sputtering, a chemical vapor deposition (CVD) process, etc.

The mesh pattern included in the transparent electrode may be formed by, e.g., a photo-lithography process.

For example, the first metal oxide layer, the metal layer and the second metal oxide layer may be sequentially formed, and then may be patterned individually or simultaneously by the photo-lithography process to form the mesh pattern.

Next, an upper laminate structure including the separation layer and the transparent electrode may be detached or peeled off from the carrier substrate.

The film touch sensor including the transparent electrode according to the present inventive concepts may have remarkably improved optical and folding properties, and reduced sheet resistance.

Further, an image display device including the touch sensor or the film touch sensor is also provided.

The touch sensor or the film touch sensor may be implemented in a liquid crystal display device, an electroluminescent display device, a plasma display device, a field emission display device, etc.

The transparent electrode according to the present inventive concepts may have remarkably improved optical and folding properties, and reduced sheet resistance, and thus may be applied to a flexible display device.

Hereinafter, exemplary embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

EXAMPLES AND COMPARATIVE EXAMPLES

Example 1: Formation of Transparent Electrode

Optical, electrical and bending (folding) properties of a transparent electrode according to the present inventive concepts were evaluated as follows. A first metal oxide layer and a second metal oxide layer were formed of indium zinc oxide (IZO), and a metal layer was formed of Ag—Pd—Cu (APC). The first metal oxide layer, the metal layer and the second metal oxide layer were sequentially formed on a COP substrate by a sputtering process, and then were etched by a photo-lithography process to from a mesh pattern having a line-width of 3 μm. Thicknesses of the first metal oxide layer, the metal layer and the second metal oxide layer were 30 nm, 10 nm and 30 nm, respectively.

Examples 2-12, and Comparative Examples 1-5

A method of Example 1 was performed while a line-width and a thickness were changed as described in Table 1 below to form transparent electrodes of Examples 2 to 12, and Comparative Examples (abbreviated as "COM") 1 to 5.

TABLE 1

|  |  | First Metal Oxide Layer | | Metal Layer | | Second Metal Oxide Layer | | Line-width of Mesh | Reflectivity of Mesh Pattern (550 nm) |
|---|---|---|---|---|---|---|---|---|---|
|  |  | M | T (nm) | M | T (nm) | M | T (nm) | Pattern (μm) | (%) |
| EXAMPLE | 1 | IZO | 30 | APC | 10 | IZO | 30 | 3 | 7.0 |
|  | 2 | IZO | 30 | APC | 10 | IZO | 30 | 5 | 7.0 |
|  | 3 | IZO | 30 | APC | 12 | IZO | 30 | 3 | 12.3 |
|  | 4 | IZO | 30 | APC | 12 | IZO | 30 | 5 | 12.3 |
|  | 5 | IZO | 30 | APC | 15 | IZO | 30 | 3 | 12.8 |
|  | 6 | IZO | 40 | APC | 12 | IZO | 40 | 3 | 12.4 |
|  | 7 | IZO | 40 | APC | 12 | IZO | 40 | 5 | 12.4 |
|  | 8 | IZO | 40 | APC | 15 | IZO | 40 | 3 | 12.8 |
|  | 9 | IZO | 50 | APC | 15 | IZO | 50 | 3 | 13.0 |
|  | 10 | IZO | 20 | APC | 15 | IZO | 20 | 3 | 18.5 |
|  | 11 | IZO | 40 | APC | 17 | IZO | 40 | 3 | 19.8 |
|  | 12 | IZO | 40 | APC | 8 | IZO | 40 | 3 | 6.8 |
|  | 13 | IZO | 40 | APC | 10 | IZO | 80 | 3 | 8.2 |
|  | 14 | IZO | 40 | APC | 10 | IZO | 100 | 3 | 8.6 |
|  | 15 | IZO | 40 | APC | 10 | IZO | 120 | 3 | 9 |
|  | 16 | IZO | 40 | APC | 10 | IZO | 140 | 3 | 9.3 |
| COM | 1 | IZO | 30 | APC | 10 | — | — | 3 | 7.0 |
|  | 2 | IZO | 30 | APC | 15 | — | — | 3 | 17.1 |
|  | 3 | IZO | 40 | APC | 17 | — | — | 3 | 21.1 |
|  | 4 | IZO | 30 | APC | 4 | IZO | 30 | 3 | 4.8 |
|  | 5 | IZO | 30 | APC | 31 | IZO | 30 | 3 | 67.2 |

(M: material, T: thickness)

Experimental Example 1

1. Measurement of Reflectivity

Reflectivities of the transparent electrodes according to Examples and Comparative Examples were measured at a wavelength of 550 nm using a spectrophotometric device (CM-3600A, Konica Minolta).

2. Measurement of Transmittance

Transmittances of the transparent electrodes according to Examples and Comparative Examples were measured at a wavelength of 550 nm using a spectrophotometric device (CM-3600A, Konica Minolta).

3. Measurement of Sheet Resistance

Sheet resistances of the transparent electrodes according to Examples and Comparative Examples were measured using a sheet resistance measuring device (RG-80, NAPS ON).

4. Measurement of Color Differences

Color differences of the transparent electrodes according to Examples and Comparative Examples were measured at a wavelength of 550 nm using a spectrophotometric device (CM-3600A, Konica Minolta).

5. Measurement of Haze

Hazes of the transparent electrodes according to Examples and Comparative Examples were measured using a haze meter (HM-150, Murasaki).

6. Measurement of Adhesion

Adhesions of the transparent electrodes according to Examples and Comparative Examples were measured using ASTM D3359 based on the following standard.

5B: No delamination
4B: Delamination less than 5%
3B: Delamination of 5% to 15%
2B: Delamination of 15% to 35%
1B: Delamination of 35% to 65%
0B: Delamination of 65% or more had entirely improved results of reflectivity, transmittance, b*, sheet resistance and adhesion.

In the Comparative Examples 1 and 2, the transparent electrodes were not visually recognized, however, showed deteriorated adhesions. In the Comparative Example 3, the transparent electrode was visually recognized while having poor adhesion.

In the Comparative Example 4, the transparent electrode was not visually recognized, however, showed excessively increased sheet resistance. In the Comparative 5, the transparent electrode was easily recognized.

Experimental Example 2: Evaluation of Folding Property

Figure 3:
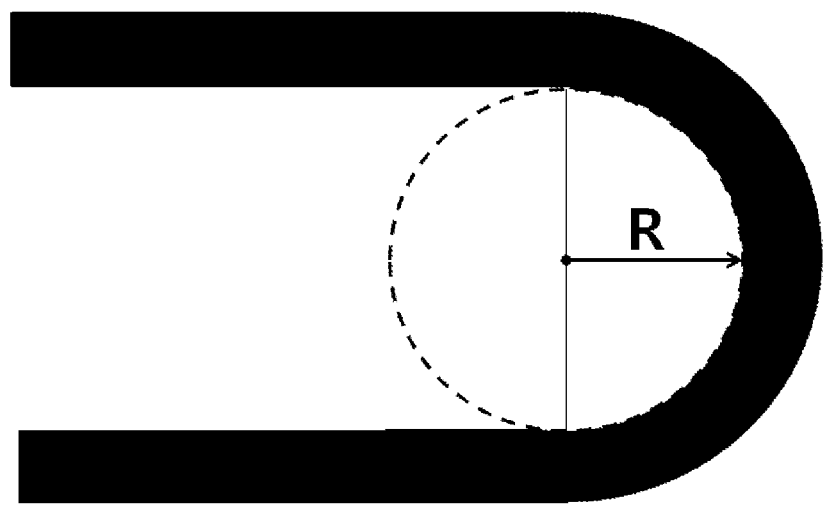
FIG. 3 is a schematic view illustrating a method of evaluating a folding property in accordance with example embodiments.
Figure 4:
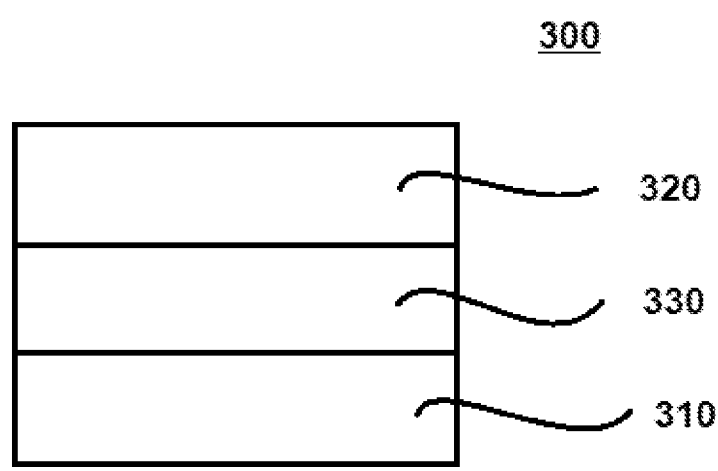
FIG. 4 is a schematic view illustrating a film touch sensor touch sensor.

As illustrated in FIG. 3, the transparent electrodes of Examples and Comparative Examples were folded with 2 mm of a radius curvature along an 180° direction by the number of folding times as described in Table 3. After the bending test, a linear resistance (kΩ) was measured to be listed in Table 3 below.

TABLE 2

|  |  | Reflectivity (550 nm) (%) | Transmittance (550 nm) (%) | Sheet Resistance (Ω/sq) | b* | Haze (%) | Adhesion (B) |
|---|---|---|---|---|---|---|---|
| EXAMPLE | 1 | 7.0 | 89.3 | 10.2 | 1.2 | 0.9 | 5 |
|  | 2 | 7.0 | 88.7 | 10.2 | 1.3 | 0.9 | 5 |
|  | 3 | 12.3 | 88.0 | 5.7 | −1.6 | 0.5 | 5 |
|  | 4 | 12.3 | 87.3 | 5.7 | −2.0 | 0.5 | 5 |
|  | 5 | 12.8 | 84.7 | 5.1 | −2.5 | 0.7 | 5 |
|  | 6 | 12.4 | 88.3 | 4.9 | −1.6 | 0.6 | 5 |
|  | 7 | 12.4 | 87.5 | 4.9 | −2.0 | 0.6 | 5 |
|  | 8 | 12.8 | 84.8 | 4.5 | −2.3 | 0.8 | 5 |
|  | 9 | 13.0 | 84.5 | 4.4 | −2.5 | 1.0 | 5 |
|  | 10 | 18.5 | 83.8 | 5.0 | −2.1 | 1.0 | 5 |
|  | 11 | 19.8 | 82.5 | 4.0 | −2.2 | 1.1 | 5 |
|  | 12 | 6.8 | 89.1 | 16.8 | −1.5 | 0.5 | 5 |
|  | 13 | 8.2 | 88.7 | 9 | 1 | 0.7 | 5 |
|  | 14 | 8.6 | 88.1 | 8.6 | 0.9 | 0.7 | 5 |
|  | 15 | 9 | 87.8 | 8.3 | 0.9 | 0.8 | 5 |
|  | 16 | 9.3 | 87.3 | 8 | 0.8 | 0.9 | 5 |
| COM | 1 | 7.0 | 88.3 | 10.0 | 0.6 | 0.8 | 0 |
|  | 2 | 17.1 | 84.0 | 6.0 | 0.8 | 1.1 | 0 |
|  | 3 | 21.1 | 80.5 | 5.4 | −2.0 | 1.6 | 3 |
|  | 4 | 4.8 | 89.3 | 72.0 | −1.5 | 0.5 | 5 |
|  | 5 | 67.2 | 61.9 | 1.2 | −3.3 | 2.8 | 5 |

Referring to Table 2 above, the transparent electrodes of Comparative Examples had degraded results of reflectivity and adhesion. However, transparent electrodes of Examples

TABLE 3

|  |  | Number of Folding | | | | | | | | | |
|---|---|---|---|---|---|---|---|---|---|---|---|
|  |  | $1*10^2$ | $5*10^2$ | $1*10^3$ | $2*10^3$ | $5*10^3$ | $1*10^4$ | $5*10^4$ | $1*10^5$ | $2*10^5$ | $6*10^5$ |
| EXAMPLE | 1 | 387.9 | 387.9 | 387.9 | 387.8 | 387.9 | 387.9 | 387.9 | 387.9 | 387.8 | 387.8 |
|  | 2 | 186.6 | 186.6 | 186.6 | 186.6 | 186.6 | 186.6 | 186.6 | 186.6 | 186.6 | 186.6 |
|  | 3 | 216.8 | 216.8 | 216.8 | 216.7 | 216.8 | 216.8 | 216.8 | 216.8 | 216.7 | 216.7 |
|  | 4 | 104.3 | 104.3 | 104.3 | 104.3 | 104.3 | 104.3 | 104.3 | 104.3 | 104.3 | 104.3 |
|  | 5 | 194.0 | 194.0 | 194.0 | 193.9 | 194.0 | 194.0 | 194.0 | 194.0 | 193.9 | 193.9 |
|  | 6 | 186.3 | 186.3 | 186.3 | 186.3 | 186.3 | 186.3 | 186.3 | 186.3 | 186.3 | 186.3 |
|  | 7 | 89.6 | 89.6 | 89.6 | 89.6 | 89.6 | 89.6 | 89.6 | 89.6 | 89.6 | 89.6 |
|  | 8 | 171.1 | 171.1 | 171.1 | 171.1 | 171.1 | 171.1 | 171.1 | 171.1 | 171.1 | 171.1 |

TABLE 3-continued

| | | Number of Folding | | | | | | | | | |
|---|---|---|---|---|---|---|---|---|---|---|---|
| | | $1*10^2$ | $5*10^2$ | $1*10^3$ | $2*10^3$ | $5*10^3$ | $1*10^4$ | $5*10^4$ | $1*10^5$ | $2*10^5$ | $6*10^5$ |
| | 9 | 167.3 | 167.3 | 167.3 | 167.3 | 167.3 | 167.3 | 167.3 | 167.3 | 167.3 | 167.3 |
| | 10 | 190.1 | 190.1 | 190.1 | 190.1 | 190.1 | 190.1 | 190.1 | 190.1 | 190.1 | 190.1 |
| | 11 | 152.1 | 152.1 | 152.1 | 152.1 | 152.1 | 152.1 | 152.1 | 152.1 | 152.1 | 152.1 |
| | 12 | 638.9 | 638.9 | 638.9 | 638.7 | 638.9 | 638.9 | 638.9 | 638.9 | 638.7 | 638.7 |
| | 13 | 342.3 | 342.3 | 342.3 | 342.2 | 342.3 | 342.3 | 342.3 | 342.3 | 342.2 | 342.2 |
| | 14 | 327.1 | 327.1 | 327.1 | 327.0 | 327.1 | 327.1 | 327.1 | 327.1 | 327.0 | 327.0 |
| | 15 | 315.6 | 315.6 | 315.6 | 315.6 | 315.6 | 315.6 | 315.6 | 315.6 | 315.6 | 315.6 |
| | 16 | 304.2 | 304.2 | 304.2 | 304.2 | 304.2 | 304.2 | 304.2 | 304.2 | 304.2 | 358.9 |
| COM | 1 | 380.3 | 380.3 | 380.3 | 380.2 | 380.3 | 380.3 | 380.3 | 532.41 | — | — |
| | 2 | 228.2 | 228.2 | 228.2 | 228.1 | 228.2 | 228.2 | 228.2 | 387.90 | — | — |
| | 3 | 205.4 | 205.4 | 205.4 | 205.3 | 205.4 | 205.4 | 205.4 | 369.65 | — | — |
| | 4 | 2,738.1 | 2,738.2 | 2,738.1 | 2,737.4 | 2,738.1 | 2,738.1 | 2,738.2 | 2738.1 | 2738.3 | 2738.1 |
| | 5 | 45.6 | 45.6 | 45.6 | 45.6 | 45.6 | 45.6 | 78.49 | — | — | — |

Referring to Table 3, the linear resistance was substantially not changed in the transparent electrodes of Examples even when the radius of curvature reached 2 mm.

However, in the Comparative Examples 1-3 and 5, the sheet resistance was highly increased when the number of folding was $10^5$ and $5*10^4$. In the Comparative Example 4, the sheet resistance was excessively high, and thus the transparent electrode was not capable of being used as a conductive member or an electrode.

Therefore, the transparent electrode according to example embodiments may have improved flexibility to be effectively applied to a flexible display device.

It will be obvious to those skilled in the related art that the preferred embodiments described above are only examples of the present inventive concepts and therefore do not limit the accompanying claims, and various modifications and alterations can be made without departing from the scope and spirit of the present invention. In addition, these modifications and alterations will fall within the following claims.

What is claimed is:

1. A film touch sensor, comprising:
   a separation layer which is detachable from a carrier substrate; and
   a touch sensor formed on the separation layer, the touch sensor including a transparent electrode comprising:
   a first metal oxide layer;
   a metal layer; and
   a second metal oxide layer,
   wherein the first metal oxide layer, the metal layer and the second metal oxide layer are sequentially stacked in a mesh pattern form;
   the transparent electrode includes a plurality of isolated sensing patterns which are disposed on the same plane; and
   a reflectivity at a wavelength of 550 nm of the mesh pattern is in a range from 5% to 20%.

2. The film touch sensor of claim 1, wherein the reflectivity at a wavelength of 550 nm is in a range from about 5% to 13%.

3. The film touch sensor of claim 1, wherein a refractive index of each the first metal oxide layer and the second metal oxide layer at a wavelength of 550 nm is in a range from 1.7 to 2.2; and
   a refractive index of the metal layer at a wavelength of 550 nm is in a range from 0.1 to 1.0, and an extinction coefficient of the metal layer is in a range from 2.0 to 7.0.

4. The film touch sensor of claim 1, wherein a thickness of each the first metal oxide layer and the second metal oxide layer is in a range from 5 nm to 140 nm, and a thickness of the metal layer is in a range from 5 nm to 30 nm.

5. The film touch sensor of claim 1, wherein a thickness of each the first metal oxide layer and the second metal oxide layer is in a range from 30 nm to 50 nm, and a thickness of the metal layer is in a range from 8 nm to 15 nm.

6. The film touch sensor of claim 1, wherein a line-width of the mesh pattern is in a range from 1 μm to 7 μm.

7. The film touch sensor of claim 1, wherein each the first metal oxide layer and the second metal oxide layer includes at least one selected from the group consisting of indium tin oxide (ITO), indium zinc oxide (IZO), aluminum zinc oxide (AZO), gallium zinc oxide (GZO), indium tin zinc oxide (ITZO), zinc tin oxide (ZTO), indium gallium oxide (IGO), tin oxide ($SnO_2$) and zinc oxide (ZnO).

8. The film touch sensor of claim 1, wherein the metal layer includes at least one selected from the group consisting of silver, gold, copper, aluminum, platinum, palladium, chromium, titanium, tungsten, niobium, tantalum, vanadium, calcium, iron, manganese, cobalt, nickel, zinc, and an alloy thereof.

9. The film touch sensor of claim 1, wherein a haze of the transparent electrode is in a range from −1% to +1%.

10. The film touch sensor of claim 1, wherein a color difference (b*) of the transparent electrode is in a range from −4 to +4.

11. The film touch sensor of claim 1, wherein a linear resistance is not changed when the transparent electrode is folded with a radius curvature of 1 mm or more along an 180° direction.

12. The film touch sensor of claim 1, wherein the sensing patterns comprise:
   a first sensing pattern formed along a first direction;
   a second sensing pattern formed along a second direction; and
   a bridge electrode connecting isolated unit patterns of the second sensing pattern.

13. The film touch sensor of claim 1, wherein the touch sensor is a self-capacitance type.

14. The film touch sensor of claim 1, further comprising a protective layer between the touch sensor and the separation layer.

15. An image display device comprising the film touch sensor of claim 1.

* * * * *